US008385680B2

(12) United States Patent
Tada (10) Patent No.: US 8,385,680 B2
(45) Date of Patent: Feb. 26, 2013

(54) IMAGE PROCESSING APPARATUS AND IMAGE PROCESSING METHOD

(75) Inventor: Junji Tada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 12/534,715

(22) Filed: Aug. 3, 2009

(65) Prior Publication Data

US 2010/0034458 A1 Feb. 11, 2010

(30) Foreign Application Priority Data

Aug. 5, 2008 (JP) ................................ 2008-201967

(51) Int. Cl.
*G06K 9/40* (2006.01)
(52) U.S. Cl. ...................................................... 382/274
(58) Field of Classification Search .................. 348/254, 348/256, 615, 650, 652, E9.054; 382/167, 382/274
See application file for complete search history.

(56) References Cited

U.S. PATENT DOCUMENTS

| 2004/0189841 A1* | 9/2004 | Oda et al. ........................ 348/294 |
| 2005/0168596 A1* | 8/2005 | Ito et al. ...................... 348/222.1 |
| 2005/0195291 A1* | 9/2005 | Kubo ........................... 348/229.1 |
| 2006/0050033 A1* | 3/2006 | Asao et al. ...................... 345/88 |
| 2007/0070214 A1 | 3/2007 | Nakamura |

FOREIGN PATENT DOCUMENTS

| JP | 2005-039457 A | 2/2005 |
| JP | 2005-039457 A | 2/2005 |
| JP | 2007-124604 A | 5/2007 |
| JP | 2007-312294 A | 11/2007 |
| JP | 2007-312294 A | 11/2007 |
| JP | 2008-072604 A | 3/2008 |

* cited by examiner

*Primary Examiner* — Gregory F Cunningham
(74) *Attorney, Agent, or Firm* — Canon U.S.A, Inc. IP Division (57) ABSTRACT

The present invention includes a calculation unit configured to calculate a target value of gradation correction of a captured image; an extraction unit configured to extract a luminance component image and a low frequency component image of the luminance component image from the captured image; a first processing unit configured to execute first gradation correction processing to the captured image using the luminance component image and the low frequency component image; a second processing unit configured to execute second gradation correction processing to the captured image by tone curve; a setting unit configured to set a correction level of the first gradation correction processing in response to input by user operation; and a determination unit configured to determine a correction amount of the first gradation correction processing and a correction amount of the second gradation correction processing based on the calculated target value and the set tone curve.

15 Claims, 13 Drawing Sheets

GRADATION CORRECTION LEVEL

⇨ STRONG

STANDARD

WEAK

NO CORRECTION

IMAGE PROCESSING APPARATUS AND IMAGE PROCESSING METHOD

BACKGROUND OF THE INVENTION

1. Field of the Invention

The present invention relates to digital image processing and particularly a technique to improve the brightness distribution of a digital image.

2. Description of the Related Art

In order to obtain an image showing suitable brightness and contrast, a method has been known which analyzes a histogram of a captured image and information about an object to execute gradation correction. Particularly, in a backlight scene in which brightness of a main object is significantly dark compared with brightness of a background, since the portion of the main object in a captured image darkens by any means, gradation correction is effective.

The gradation correction includes a method which uses a correction table (tone curve) to convert each input luminance value into a predetermined output luminance value. Particularly with respect to the backlight scene, a method is discussed which sets a correction table that suppresses correction to prevent overexposure of a bright area in the background while the main object is corrected to suitable brightness (refer to Japanese Patent Application Laid-Open No. 2007-124604). Further, a method is discussed which executes gradation correction using a low frequency component signal of a luminance component of an image to obtain effect such as dodging process (refer to Japanese Patent Application Laid-Open No. 2008-072604). In this method, gradation correction can be executed while contrast of an image is maintained compared with tone curve.

However, in Japanese Patent Application Laid-Open No. 2007-124604, gradation correction is executed such that a dark portion of an image is corrected to be bright and correction of an originally bright portion is suppressed by tone curve. Thus, when gradation correction is executed by this method, in a luminance band in the middle of the main object and the background, contrast is lost and a smooth expressionless image is obtained. Further, in Japanese Patent Application Laid-Open No. 2008-072604, when gradation correction is executed using a low frequency component signal of a luminance component of an image, in some scenes, too much contrast appears, so that unnatural image is obtained.

SUMMARY OF THE INVENTION

According to an aspect of the present invention, an apparatus includes a calculation unit configured to calculate a target value of gradation correction of a captured image; an extraction unit configured to extract a luminance component image and a low frequency component image of the luminance component image from the captured image; a first processing unit configured to execute first gradation correction processing to the captured image using the luminance component image and the low frequency component image; a second processing unit configured to execute second gradation correction processing to the captured image by tone curve; a setting unit configured to set a correction level of the first gradation correction processing in response to an input by a user operation; and a determination unit configured to determine a correction amount of the first gradation correction processing and a correction amount of the second gradation correction processing based on the calculated target value and the set tone curve.

According to another aspect of the present invention, a method includes calculating a target value of gradation correction of a captured image; extracting a luminance component image and a low frequency component image of the luminance component image from the captured image; executing first gradation correction processing to the captured image using the luminance component image and the low frequency component image; executing second gradation correction processing to the captured image by tone curve; setting a correction level of the first gradation correction processing in response to an input by a user operation; and determining a correction amount of the first gradation correction processing and a correction amount of the second gradation correction processing based on the calculated target value and the set correction level.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
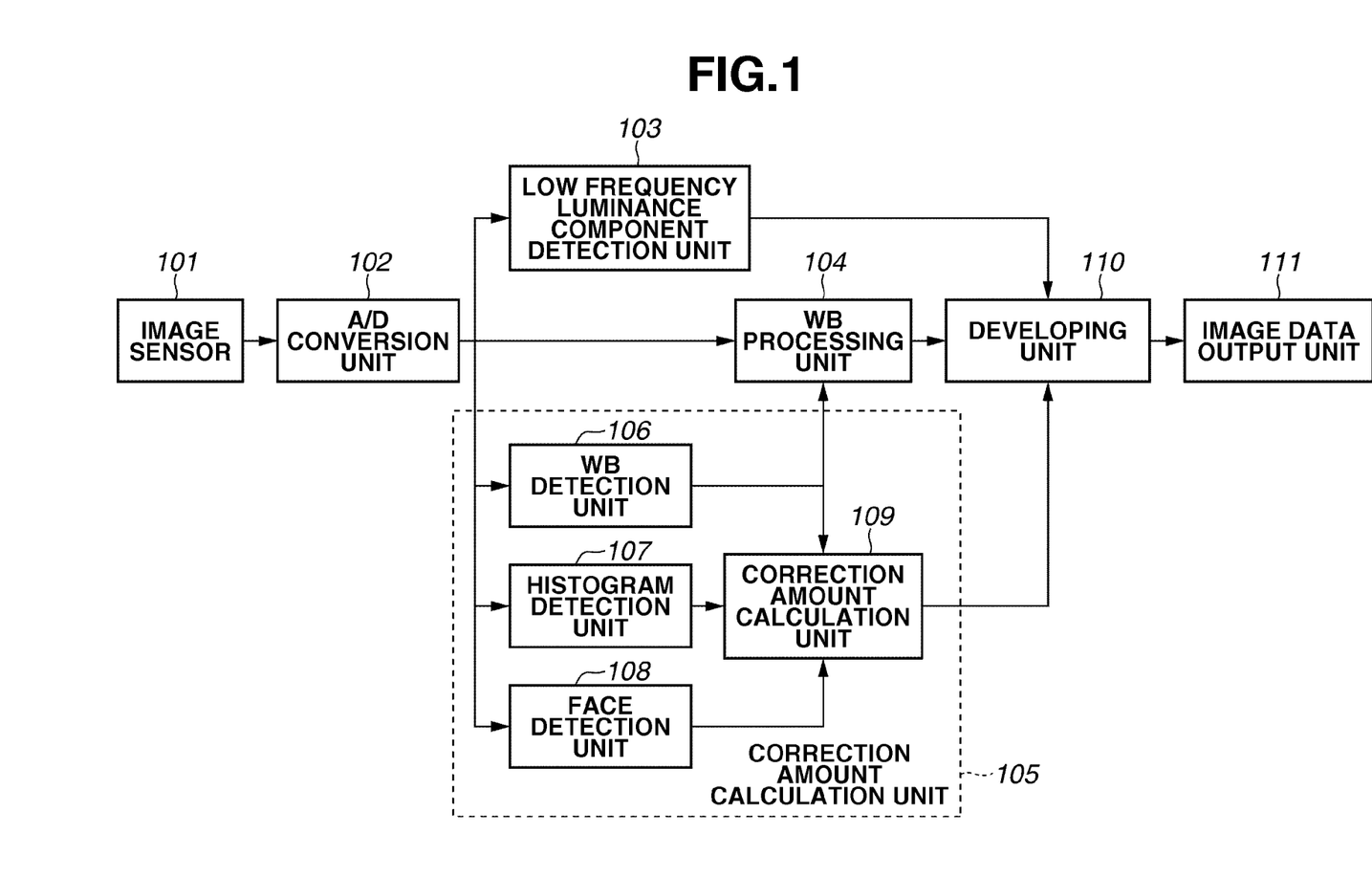
FIG. 1 is a block diagram illustrating one configuration example of a digital camera capable of realizing an image processing method according to an exemplary embodiment of the present invention.

FIG. 1 is a block diagram illustrating one configuration example of a digital camera capable of realizing an image processing apparatus of the present invention. In FIG. 1, an optical image of an object passing through an imaging lens (not shown) is imaged on an image sensor 101 and converted into an electric charge corresponding to its amount of light.

The image sensor 101 is covered by, for example, a red (R), a green (G) and a blue (B) color filter. Each color filter has spectral sensitivity on the periphery of a wavelength band of each color. A photoelectric converter corresponding to each color filter photo-electrically converts each light of a band passing through each color filter. An electric charge converted by each photoelectric converter is output from the image sensor 101 to an analog/digital (A/D) conversion unit 102 as an electric signal and converted into a digital signal (image data) by A/D conversion processing.

A digital signal (input image data) output from the A/D conversion unit 102 is transmitted to each of a low frequency luminance component detection unit 103, a correction amount calculation unit 105, and a white balance (WB) processing unit 104. The WB processing unit 104 integrates a white balance gain value obtained in a WB detection unit 106 to be each RGB pixel value of an image. Image data subjected to WB processing in the WB processing unit 104 is transmitted to a developing unit 110. The developing unit 110 executes luminance correction processing (first gradation correction processing) using a low frequency luminance component which will be described later and tone curve processing (second gradation correction processing) An image data output unit 111 makes files from image data subjected to development processing and outputs it. For example, when a file format is converted into a Joint Photographic Experts Group (JPEG) file, image data is subjected to three-dimensional matrix conversion into a YCrCb format and attaches appendix data, thereby converting the data into the JPEG file.

Figure 2:
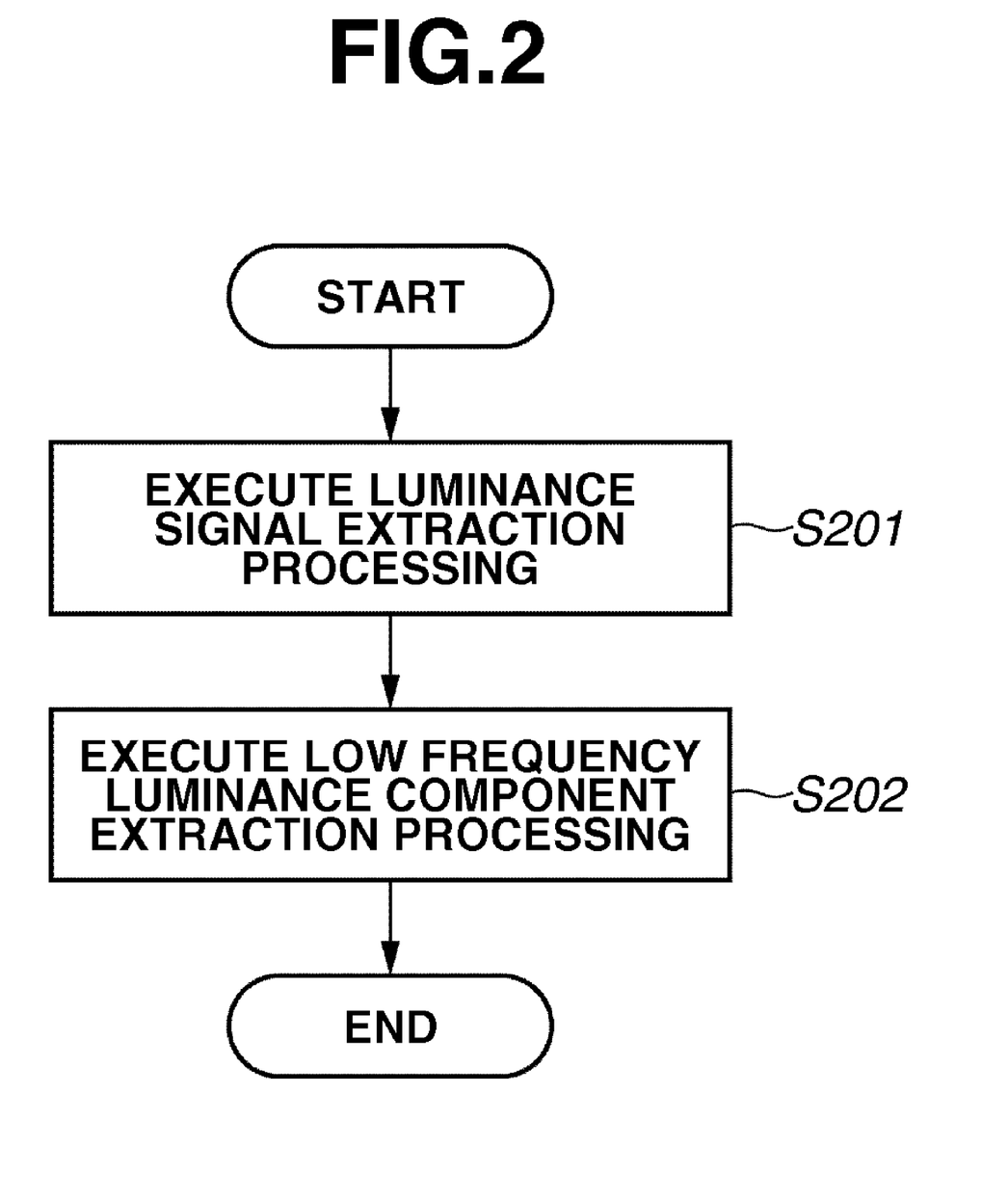
FIG. 2 is a flowchart illustrating low frequency luminance component detection processing.

Next, the detail of processing of each block will be described. FIG. 2 is a flowchart illustrating processing to be executed in the low frequency luminance component detection unit 103. In FIG. 2, first in step S201, the low frequency luminance component detection unit 103 executes luminance signal extraction processing to input image data. For example, when an image for color adjustment is represented by an sRGB color space which is described in International Electrotechnical Commission (IEC) 61966-2-1, extraction of a luminance component complies with a method described in IEC61966-2-1. In other words, the method converts it into CIE1931XYZ by gamma transformation and matrix calculation of 3 rows and 3 columns. A pixel value (R(x,y), G(x,y), B(x,y)) in a position (x,y) is transformed and data of XYZ after the transformation shall be provided by X(x,y), Y(x,y), Z(x,y) respectively. In this case, Y(x,y) is a luminance component to be extracted, and X(x,y) and Z(x,y) are a color component. In the present exemplary embodiment, since a pixel value of an image is defined by the sRGB color space, luminance is defined by an sYCC color space. Therefore, the low frequency luminance component detection unit 103 calculates a luminance component using the following transformation equation (1):

$$Y=0.299 \times R+0.587 \times G+0.114 \times B \quad (1)$$

However, a following approximate equation (2) may also be used.

$$Y=(3 \times R+6 \times G+B)/10 \quad (2)$$

A luminance component image with the same or similar magnification can be acquired by the above processing. However, a size between an original image and a luminance component image may not be the same. For example, luminance component extraction in this step S201 may be configured so as to perform reduction processing on input image data. The reduction processing may be any well-known method. However, the reduction processing can easily be realized, for example, by thinning processing, a most neighborhood method and an average value method.

In step S202, the low frequency luminance component detection unit 103 executes low frequency component extraction processing to a luminance component image generated in step S201 to generate a low frequency luminance component image. In the present exemplary embodiment, low-pass filter processing is executed as low frequency component extraction method. In the present exemplary embodiment, in this step, three low frequency component images are generated using three low-pass filters different in filter size.

Figure 3:
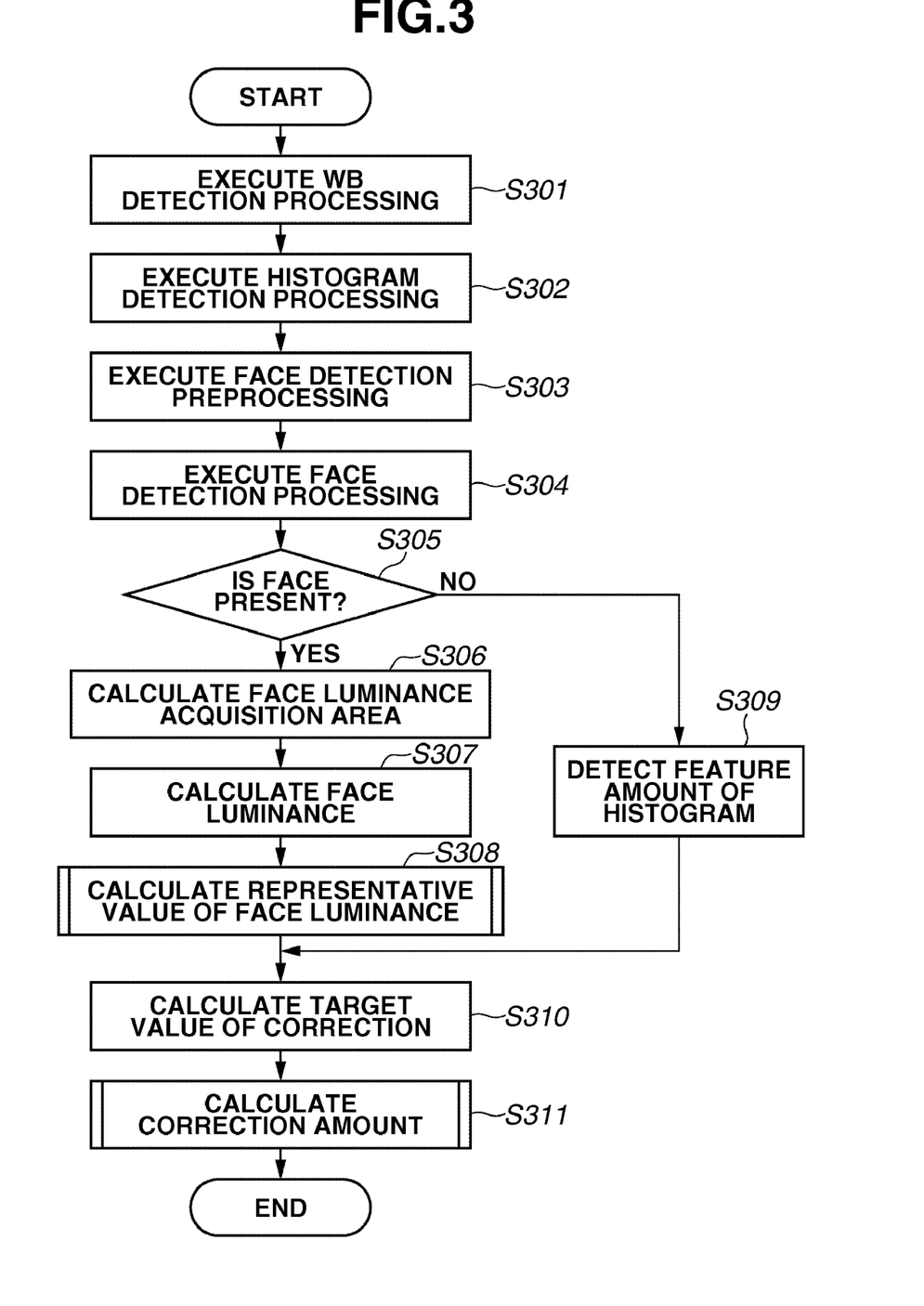
FIG. 3 is a flowchart illustrating correction amount calculation processing.

FIG. 3 is a flowchart illustrating processing that is executed in the correction amount calculation unit 105. In FIG. 3, in step S301, the correction amount calculation unit 105 executes WB detection processing. The WB detection unit 106 calculates a white balance gain value suitable for a captured scene from input image data.

In step S302, the correction amount calculation unit 105 executes histogram detection processing. In step S302, a histogram detection unit 107 applies a predetermined WB gain to the whole captured image data and gamma processing is executed to the applied data. Then, the correction amount calculation unit 105 detects a histogram of image data subjected to the gamma processing. In the present exemplary embodiment, the gamma processing employs a method using a lookup table. In the present exemplary embodiment, a histogram shall be detected in a whole range of the image data but the histogram may also be detected from those which have cut an edge portion.

In step S303, the correction amount calculation unit 105 executes face detection preprocessing. In this step, a face detection unit 108 applies reduction processing and gamma processing to input image data to detect easily a face which is contained in an image. In step S304, the correction amount calculation unit 105 executes face detection processing. In this step, the face detection unit 108 detects a face area in the input image data. This detection processing includes texture detection processing for the input image data and pattern recognition processing (recognition processing of an area such as eye, nose, mouth and face contour), which is performed on a result of the pattern recognition processing. Then, using a preset evaluation threshold value, a degree of reliability of a face is evaluated for an area obtained by these processing.

In step S305, the face detection unit 108 determines presence or absence of a face based on the evaluation result of face detection processing in step S304. When there are one or more areas where reliability of a face is larger than an evaluation threshold value, the face detection unit 108 determines the area as a face. Then, the face detection unit 108 outputs a coordinate of an eye contained in its area. The processing proceeds to a step of face luminance calculation processing in step S306 and thereafter. When it is determined that a face area is absent, the processing proceeds to step S309.

Figure 4:
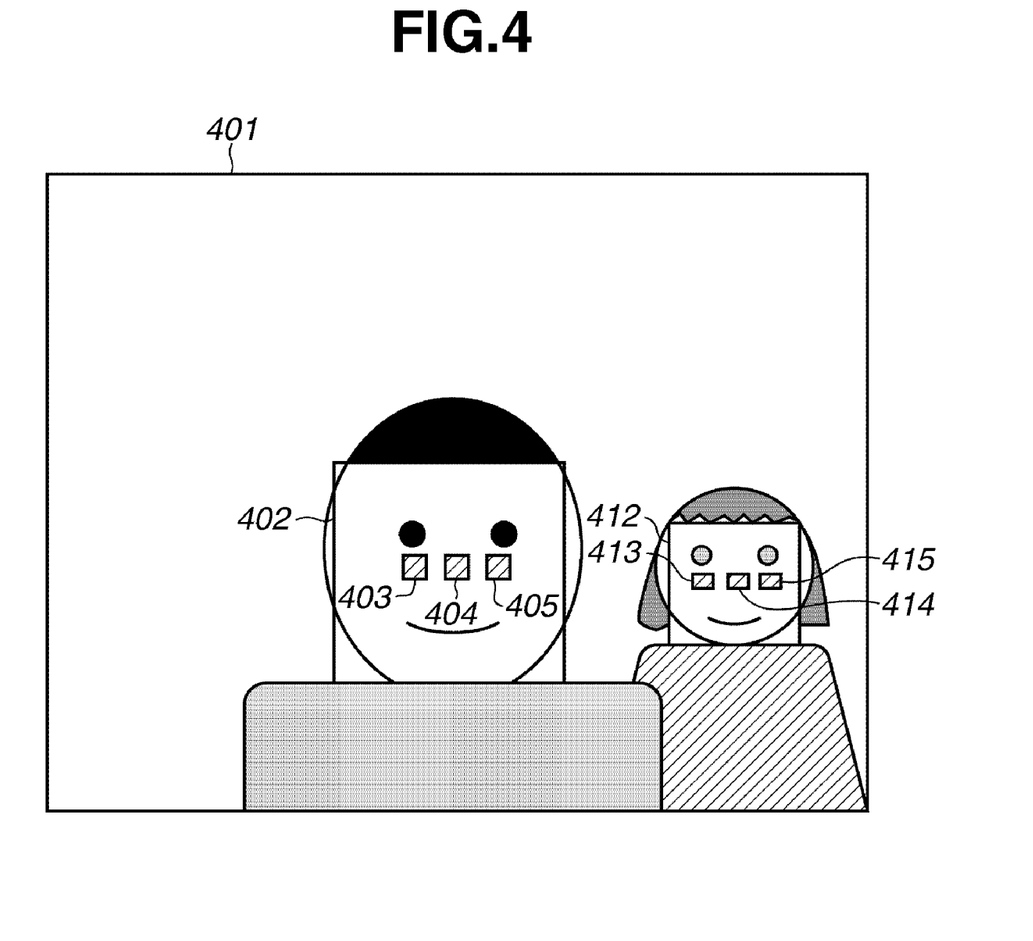
FIG. 4 is a diagram illustrating a face luminance acquisition area of a detected face.

In step S306, the correction amount calculation unit 105 executes calculation of a face luminance acquisition area. In this step, a correction amount calculation unit 109 calculates an area that acquires face luminance based on the face detected result. For example, as shown in FIG. 4, within a range 401 of the whole of image data, with respect to face detected areas 402 and 412 (areas where a face has been detected), the correction amount calculation unit 109 calculates three areas below both eyes and therebetween. In other words, areas 403, 404 and 405, and areas 413, 414 and 415 are calculated. Each area shall be a square area which is determined by a ratio to a size of the face detected area 402 (412). In step S307, the correction amount calculation unit 109 determines each average value of an R pixel, a G pixel and a B pixel of input image data for each face luminance acquisition area and converts the value into a luminance value Y by equation (1). In this conversion, the approximate equation such as equation (2) may also be employed.

In subsequent step S308, calculation of the representative value of face luminance is executed. One example of this method is illustrated in a flowchart in FIG. 5. First, in step S501, the correction amount calculation unit 105 determines a maximum luminance value among three locations for each face. In step S502, the correction amount calculation unit 105 determines whether a plurality of faces is present. When a plurality of faces is present (YES in step S502), the processing proceeds to step S503. In step S509, when only one face is present (NO in step S502), the correction amount calculation unit 105 determines a maximum luminance value obtained in step S501 for this face as a representative value of face luminance. In an example shown in FIG. 4, since two faces (402 and 412) are present, the correction amount calculation unit 105 obtains a representative value Y0 for areas 403, 404 and 405 of the face detected area 402, and calculates Y1 for areas 413, 414 and 415 of the face detected area 412.

Figure 5:
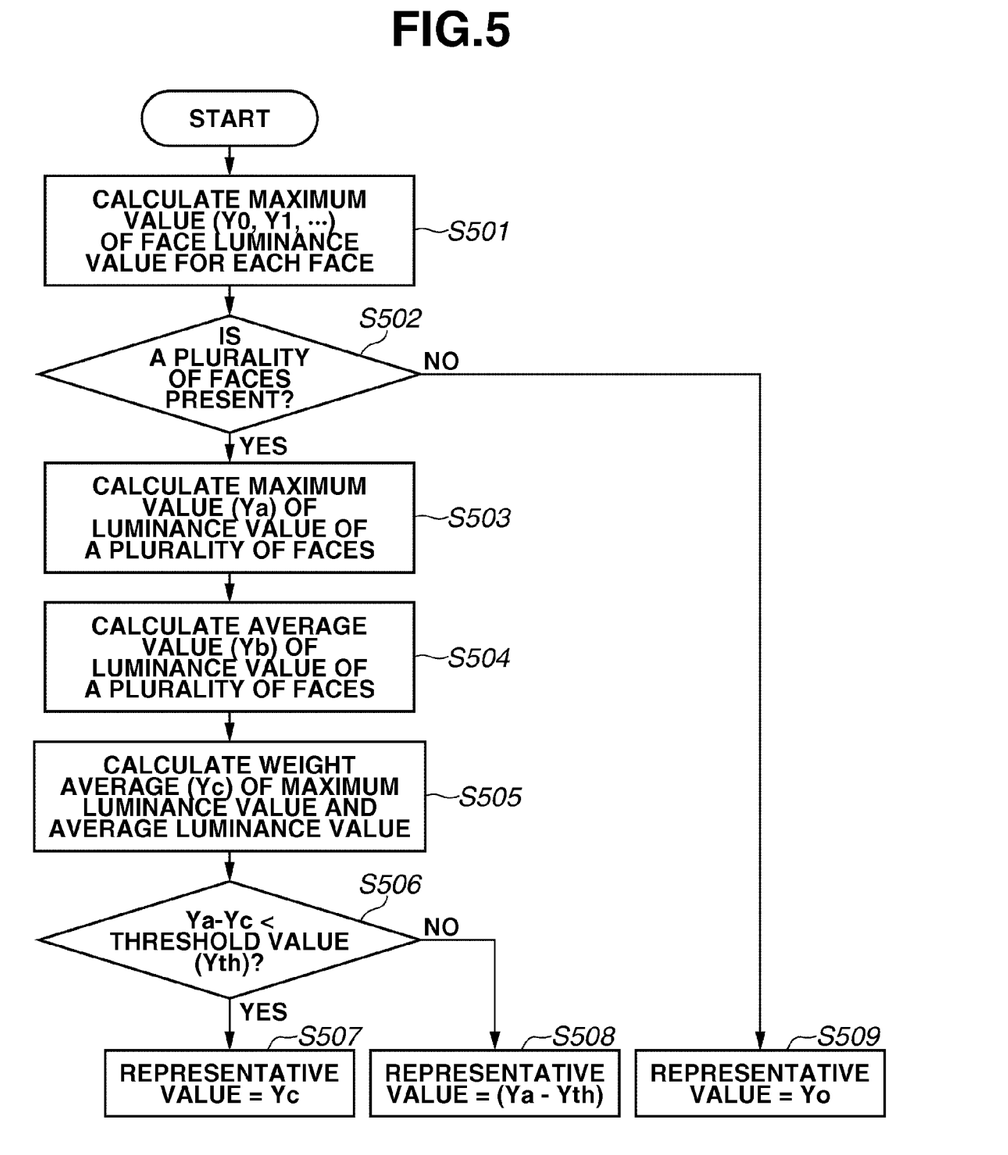
FIG. 5 is a flowchart illustrating calculation of a representative value of face luminance.

In step S503, the correction amount calculation unit 105 obtains a maximum luminance value (Ya) among a plurality of faces. In an example shown in FIG. 4, a larger value between Y0 and Y1 is Ya. In step S504, the correction amount calculation unit 105 obtains an average luminance value (Yb) among a plurality of faces. In an example shown in FIG. 4, the correction amount calculation unit 105 obtains an average of the representative value Y0 for the face detected area 402 and the representative value Y1 for the face detected area 412. In step S505, the correction amount calculation unit 105 obtains an average value (Yc) weighted by a predetermined weight to the maximum face luminance value (Ya) and the average value (Yb) of a face luminance value.

In step S506, the correction amount calculation unit 105 determines whether a difference between the maximum face luminance value (Ya) and the weight average value (Yc) is smaller than a predetermined threshold value (Y th). If this difference is smaller than a threshold value (YES in step S506), in step S507, the correction amount calculation unit 105 chooses the weight average value (Yc) as the representative value of face luminance. If it is not (NO in step S506), in step S508, the correction amount calculation unit 105 chooses as a representative value a value subtracting the threshold value (Y th) from the maximum value (Ya) of a face luminance value. By determining a representative value as described above, brightness correction can be impartially executed to a plurality of faces. On the other hand, even if one exceptionally bright face is included, the correction amount calculation unit 105 can perform correction based on the face and surely reduce a failure in capturing an image.

Figure 6:
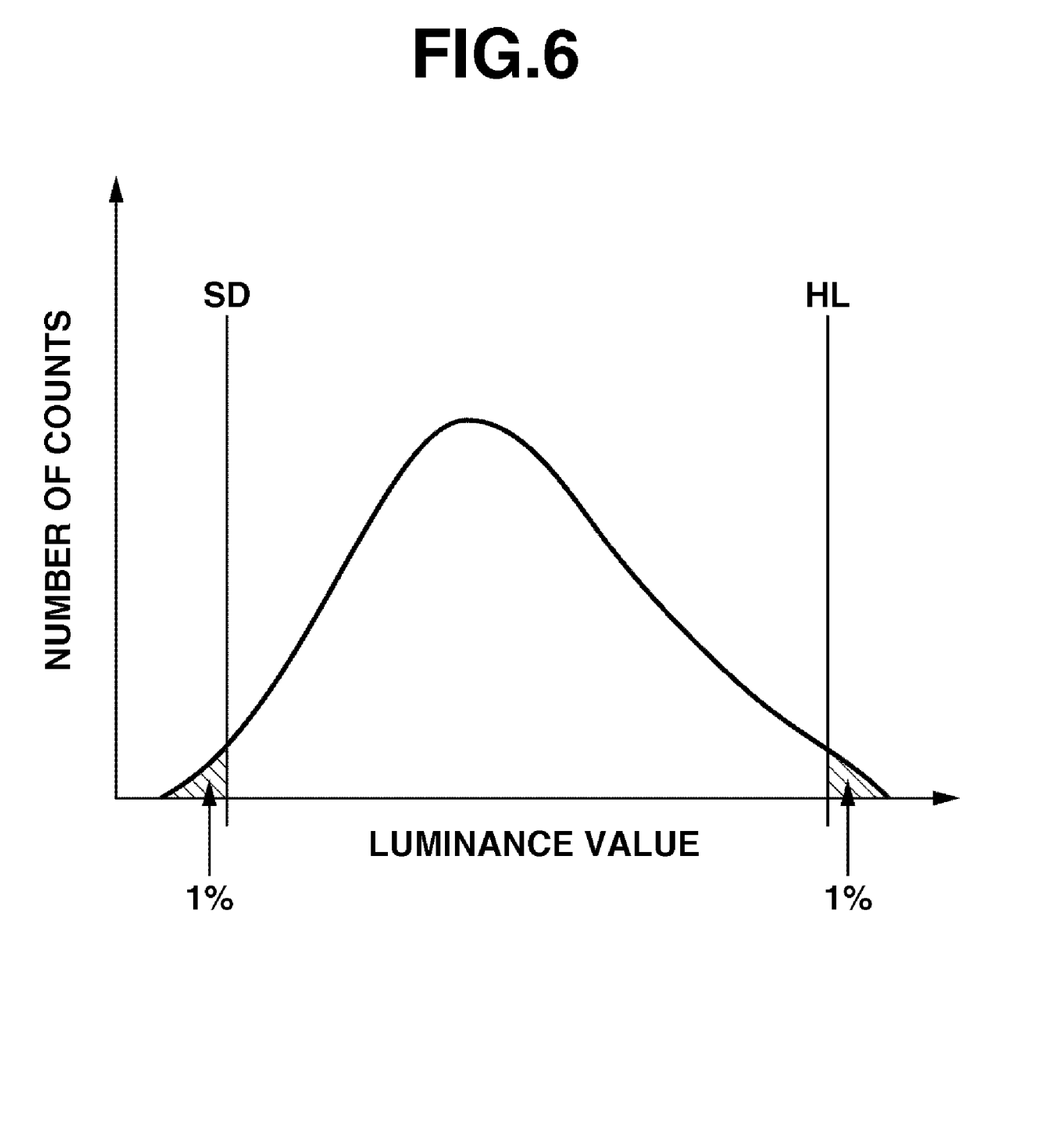
FIG. 6 is a diagram illustrating one example of a detected histogram.

Returning to FIG. 3, when a face has not been detected, in step S309, the correction amount calculation unit 109 detects a feature amount of a histogram obtained in the histogram detection unit 107. In this step, as shown in FIG. 6, the correction amount calculation unit 109 determines a level (SD) to which pixels with a cumulative frequency of 1% belong from a dark side, and a level (HL) to which pixels with a cumulative frequency of 1% belong from a highlight side in a histogram.

Figure 7A:
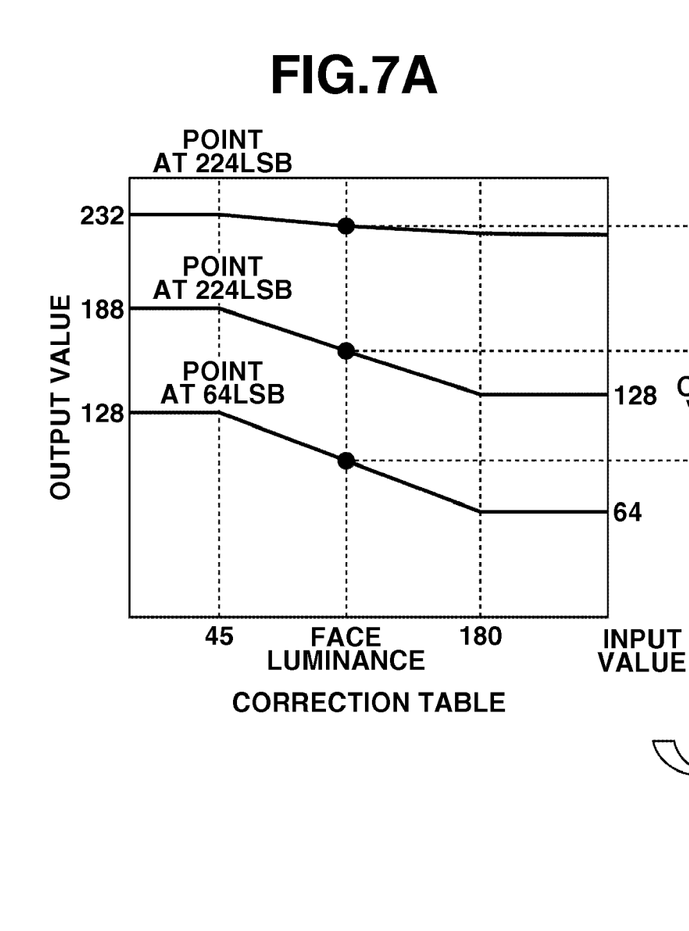
FIGS. 7A and 7B are a diagram illustrating relation between a correction table and a lookup table.

In step S310, the correction amount calculation unit 105 executes calculation of a target value of correction. In calculation of a target luminance level, various methods are considered. In the present exemplary embodiment, a method of generating a lookup table of the target luminance level using a correction table is employed. In other words, as shown in FIG. 7A, a correction table setting the target luminance level with respect to the representative value of face luminance is held in a memory in advance (not shown). Then, the correction amount calculation unit 105 refers to this table, and obtains a target value corresponding to three least significant bits (LSB) from the representative value of face luminance. The correction amount calculation unit 105 generates a lookup table of an output luminance level relative to an input luminance level, from these target values, a minimum value and a maximum value of image luminance, using spline interpolation or the like.

Figure 7B:
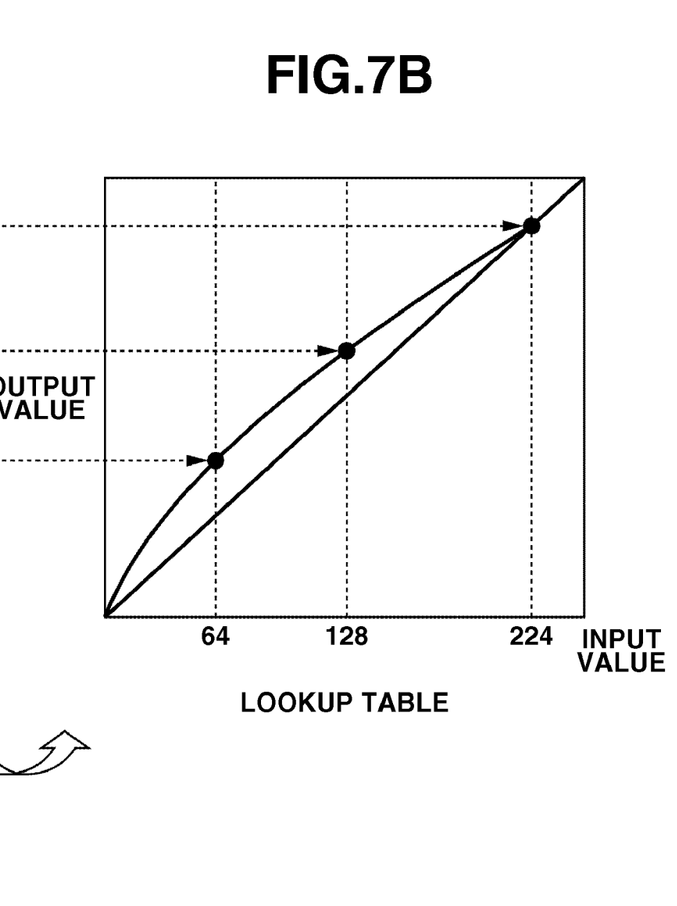

FIG. 7B illustrates an example of a lookup table generated when a face is present. Similarly, even when a face is absent, a similar lookup table can be generated using a correction table corresponding to the SD and HL value of a histogram obtained in step S309.

In step S311, the correction amount calculation unit 105 calculates a correction amount using a low frequency luminance component and a correction amount using tone curve, and transmits the result to the developing unit 110, thus, the processing of the correction amount calculation unit 105 is completed. Processing in step S311 will be described in detail later.

Figure 8:
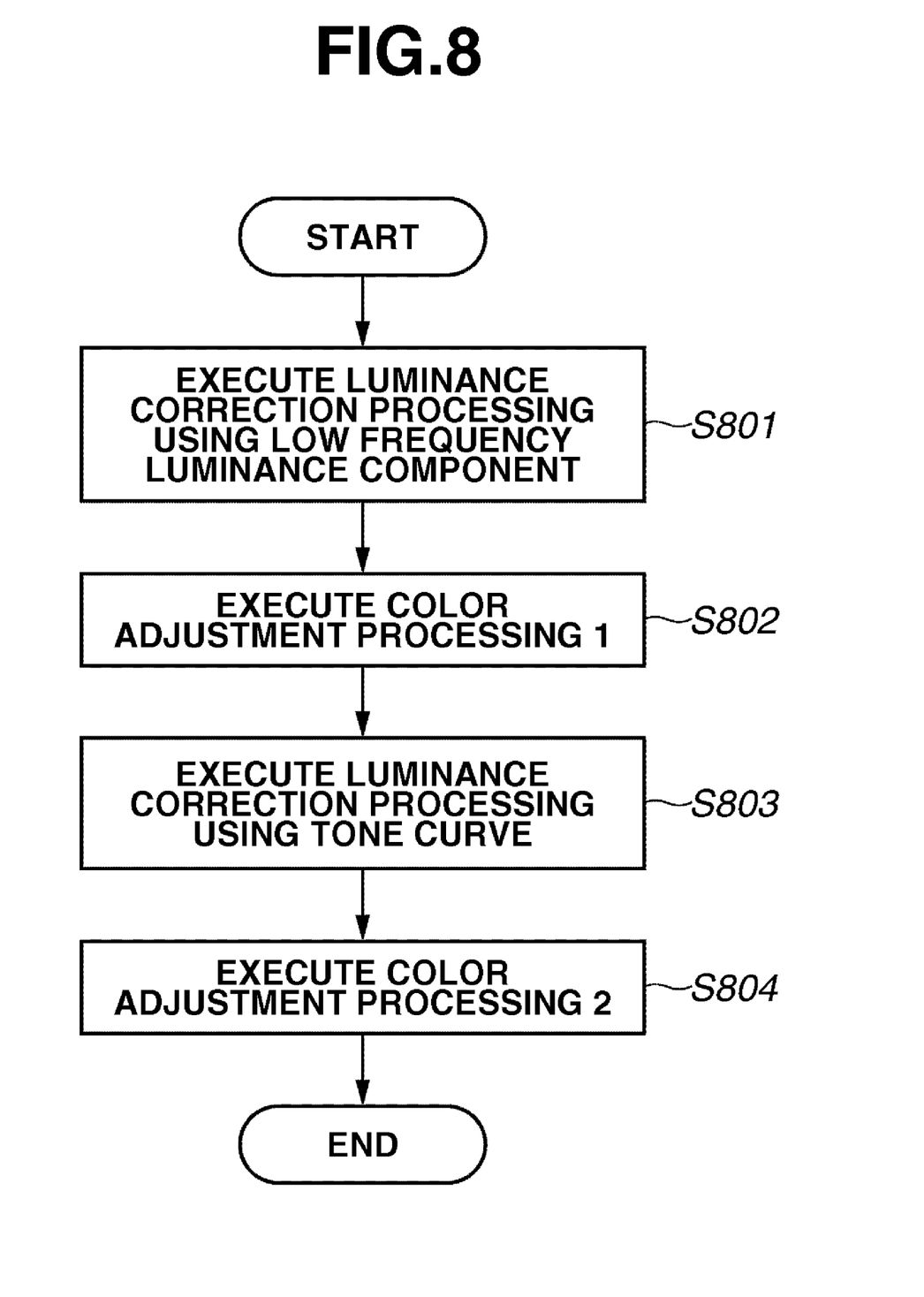
FIG. 8 is a flowchart illustrating development processing.

The detail of gradation correction processing (first gradation correction processing, second gradation correction processing) in the developing unit 110 will be described using a flowchart in FIG. 8. In step S801 shown in FIG. 8, luminance correction processing using a low frequency luminance component is executed.

This correction processing is executed by a method similar to Japanese Patent Application Laid-Open No. 2008-072604. More specifically, the developing unit 110 logarithmically converts the distribution of a scale-converted luminance component, determines an average value on a different scale (different resolution), outputs a difference between the average value and logarithmic conversion of an original luminance component, and executes processing to return to an original luminance unit by inverse transformation (exp calculation). In order to adjust a degree of improvement corresponding to an image, logarithmic conversion output of a scale-converted luminance component is multiplied by a coefficient. This coefficient is a parameter to adjust a degree of improvement. Output of the improved luminance component based on the processing described above is given by the following equation (3):

$$Y'(x,y) = \exp\{\gamma_0 \cdot \log Y(x,y) - \gamma_1 \cdot \text{Avg}\{ \log [F_n(x,y)*Y(x,y)]\}\} \quad (3)$$

where y'(x,y), Fn(x,y) and n are output of the improved luminance component at a coordinate (x,y), a Gaussian function at a coordinate (x,y) and a parameter which represents a scale respectively. Further, Y0 and Y1 are a parameter 0 which represents a degree of improvement and a parameter 1 which represents a degree of improvement respectively. Furthermore, * represents sum-of-product calculation and Avg represents average value calculation.

When this luminance conversion is attained by hardware, the hardware can include, for example an average value calculation circuit, a circuit which generates a lookup table, a table storage unit, a table reference circuit (portion of gamma transformation), and a division circuit. The average value calculation circuit may be provided in a portion that realizes low frequency luminance signal extraction.

Figure 11:
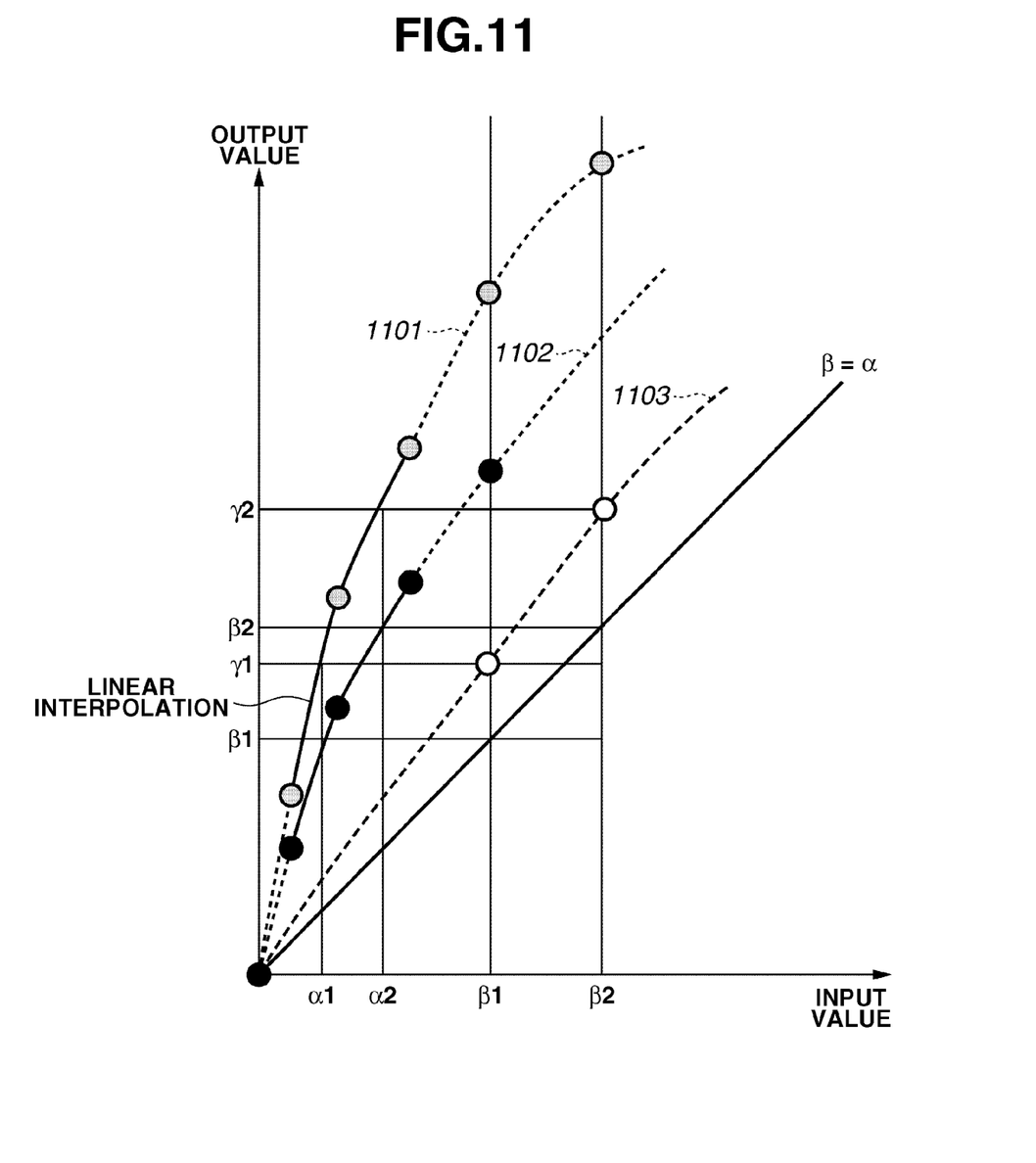
FIG. 11 is a schematic diagram illustrating a calculation method of a correction amount of tone curve.

As described later, strength of luminance correction processing using a low frequency luminance component is represented by a lookup table which includes a curve 1102 in FIG. 11. Then, the parameter Y0 and the parameter Y1 which represent a degree of improvement in the above-described equation (3) are determined by a value in this lookup table.

In step S802, the developing unit 110 executes color adjustment processing accompanied by luminance correction processing using a low frequency luminance component. In the color adjustment processing, a color component is modified according to the change of a luminance component to make a color of image data after processing invariable as much as possible. For example, each of a color component $X(x,y)$ and $Z(x,y)$ is multiplied by a ratio $Y'(x,y)/Y(x,y)$ before and after the change of a luminance component. Alternately, simplification of processing is easy to achieve such that only $Y(x,y)$ is changed to $Y'(x,y)$, and the color component $X(x,y)$ and $Z(x,y)$ are not processed.

In step S803, the developing unit 110 executes luminance correction processing using tone curve. This processing uses a lookup table of output luminance data to each input luminance. In step S804, the developing unit 110 executes color adjustment processing accompanied by luminance correction processing using tone curve. This processing may be similar to that in step S802. Further, the developing unit 110 may combine step S802 and step S804, and may execute color adjustment processing at the end according to the change of a luminance value caused by luminance correction processing using a low frequency luminance component and correction processing using tone curve.

Figure 9:
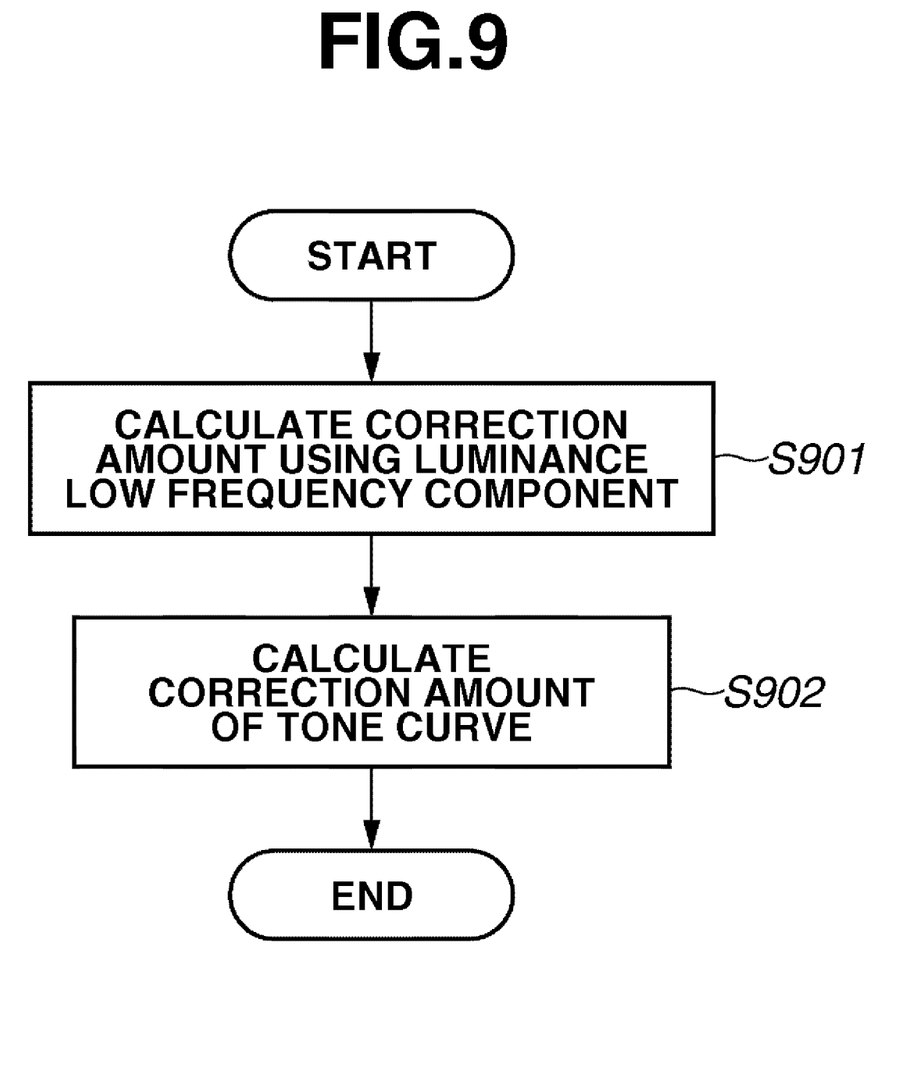
FIG. 9 is a flowchart illustrating correction curve generation processing.

Next, the details of calculation processing of a correction amount in step S311 shown in FIG. 3 will be described. A flowchart of this calculation processing is shown in FIG. 9. In step S901 shown in FIG. 9, the correction amount calculation unit 109 calculates a correction amount using a low frequency luminance component image. In the present exemplary embodiment, the correction amount calculation unit 109 uses three low frequency luminance component images different in frequency band generated in the low frequency luminance component detection unit 103. Further, the correction amount calculation unit 109 calculates a pixel value after correction with a plurality of these low frequency luminance component images, executes weighing addition of these values, and obtains a final correction image.

A certain low frequency luminance component pixel $Fn(x,y)*Y(x,y)$ of image data described in equation (3) will be described as $Ln(x,y)$ hereinafter. Further, in the present exemplary embodiment, among three low frequency component images, a highest frequency component image shall be represented by $LH(x,y)$, a lowest frequency component image shall be represented by $LL(x,y)$, and a remaining intermediate frequency component image shall be represented by $LM(x,y)$.

As obviously seen from equation (4) described later, in correction processing in the present step, a pixel value after correction is to be determined by not only a luminance value $Y(x,y)$ of a pixel to be observed but also its low frequency luminance components $LH(x,y)$, $LM(x,y)$ and $LL(x,y)$. However, since a target value of a correction amount determined in step S310 is a target value only as to the luminance value $Y(x,y)$ of the pixel to be observed, calculation of a correction amount is executed by approximation to correction using only the luminance value $Y(x,y)$ of the pixel to be observed, in other words, to correction by tone curve.

Figure 10:
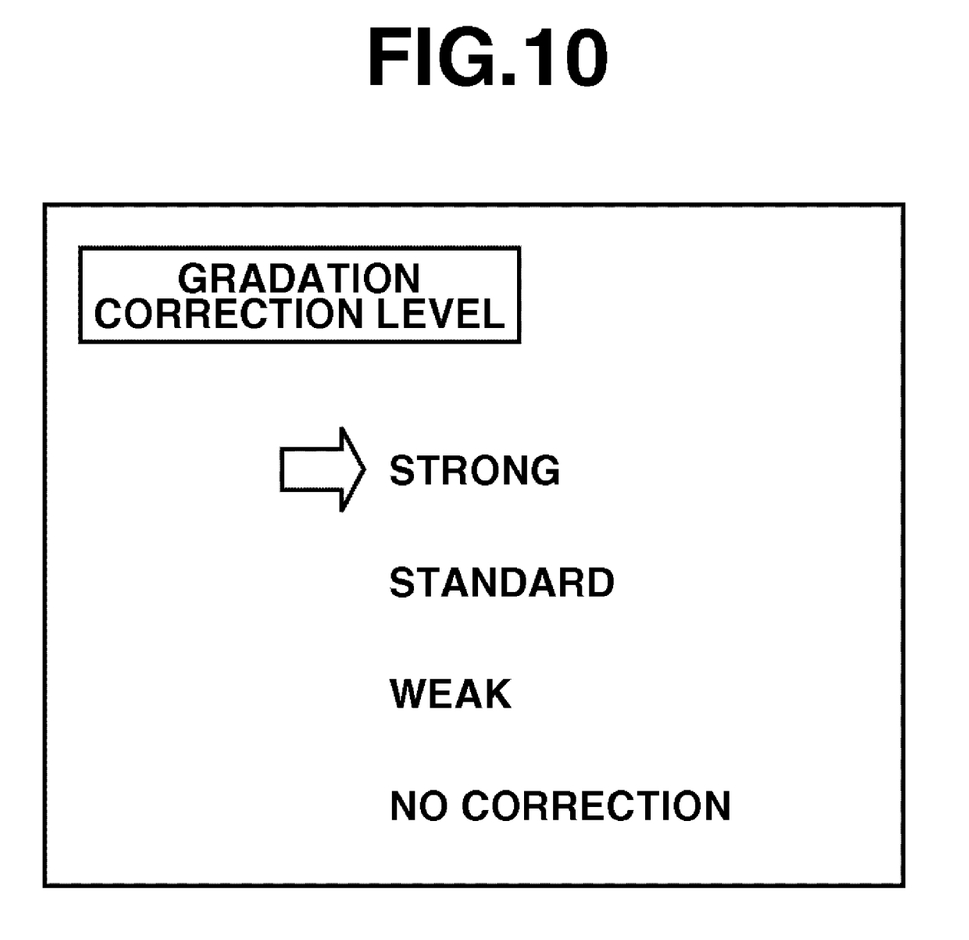
FIG. 10 is a diagram illustrating a user interface for determining a correction amount of gradation correction.

In the present exemplary embodiment, a user can set a correction level of correction using a low frequency luminance component prior to imaging. FIG. 10 is one example of its user interface and a central processing unit (CPU) of a camera (not shown) controls its operation. In a setting screen displayed on a liquid crystal panel included in the camera, "strong", "standard", "weak" and "no correction" are displayed as a selection item of a correction level. A user operates a predetermined operation member to select the items. When operation input to select any item is performed, a correction table corresponding to selection items is read from a memory (not shown) in response to its selection. When "no" is selected, a ratio of correction using a low frequency luminance component is provided by "0".

After the imaging starts, a lookup table (corresponding to curve 1102 in FIG. 11) of a correction amount using a low frequency luminance component is generated from relation between a read correction table and a lookup table of a target correction value determined by a captured image. Since a correction table corresponding to each item determines an absolute amount of correction, a value of this lookup table may exceed a correction amount of the target value. In such a case, the correction amount calculation unit 109 adjusts the lookup table such that a correction amount of the target value becomes a correction value of correction using a low frequency luminance component.

In the present exemplary embodiment, an absolute amount of correction is determined based on user operation. However, an absolute amount may not necessarily be set. Instead, a ratio of a correction amount using a low frequency luminance component to a target value of the whole correction may be set. Further, an absolute amount or a ratio may be set not only by the user operation. Instead, when it is determined that a face is present as a result of face detection, a value larger than a ratio to be originally set may also be set. This allows the user to avoid time and effort of determining presence or absence of a face and adjusting an image or capturing an image again in order not to impair contrast of a face portion.

In step S902, the correction amount calculation unit 109 calculates a correction amount by tone curve. In this step, the correction amount calculation unit 109 combines correction using a low frequency luminance component determined beforehand and correction by tone curve to calculate a correction amount by tone curve such that a target value of a correction amount determined beforehand is provided. Since correction using a low frequency luminance component uses low frequency luminance components $LH(x,y)$, $LM(x,y)$ and $LL(x,y)$, there are various luminance values before correction of a pixel which provides a similar luminance level as a result of correction. Thus, the correction amount calculation unit 109 calculates a correction amount of tone curve by approximation to correction using only a luminance value $Y(x,y)$ of a pixel to be observed, in other words, to correction by tone curve.

In order to determine a correction amount of tone curve, in other words, an output value relative to a certain input value, an input value of correction using a low frequency luminance component is obtained such that an output value of correction using a low frequency luminance component becomes the input value. And a target value of a correction amount to this input value is calculated. Its calculation example is shown in FIG. 11. A curve 1101 in FIG. 11 illustrates a target correction value and a curve 1102 illustrates a correction amount using a low frequency luminance component. Each is configured by a discrete lookup table with data of an output luminance value relative to an input luminance value.

In a lookup table of tone curve, when "an output value ($\beta$) of correction using a low frequency luminance component relative to an input value ($\alpha$)" is an input value ($\beta$), "a target value (Y) of a correction amount relative to the input value ($\alpha$)" may be provided by an output value (Y). In FIG. 11, Y1 corresponding to values $\alpha 1$ and $\beta 1$, and Y2 corresponding to values $\alpha 2$ and $\beta 2$ are points which configure a lookup table of tone curve. Since a target correction value and a correction amount using a low frequency luminance component is a lookup table having discrete values, data is interpolated by a linear interpolation to execute calculation of each value.

Figure 12:
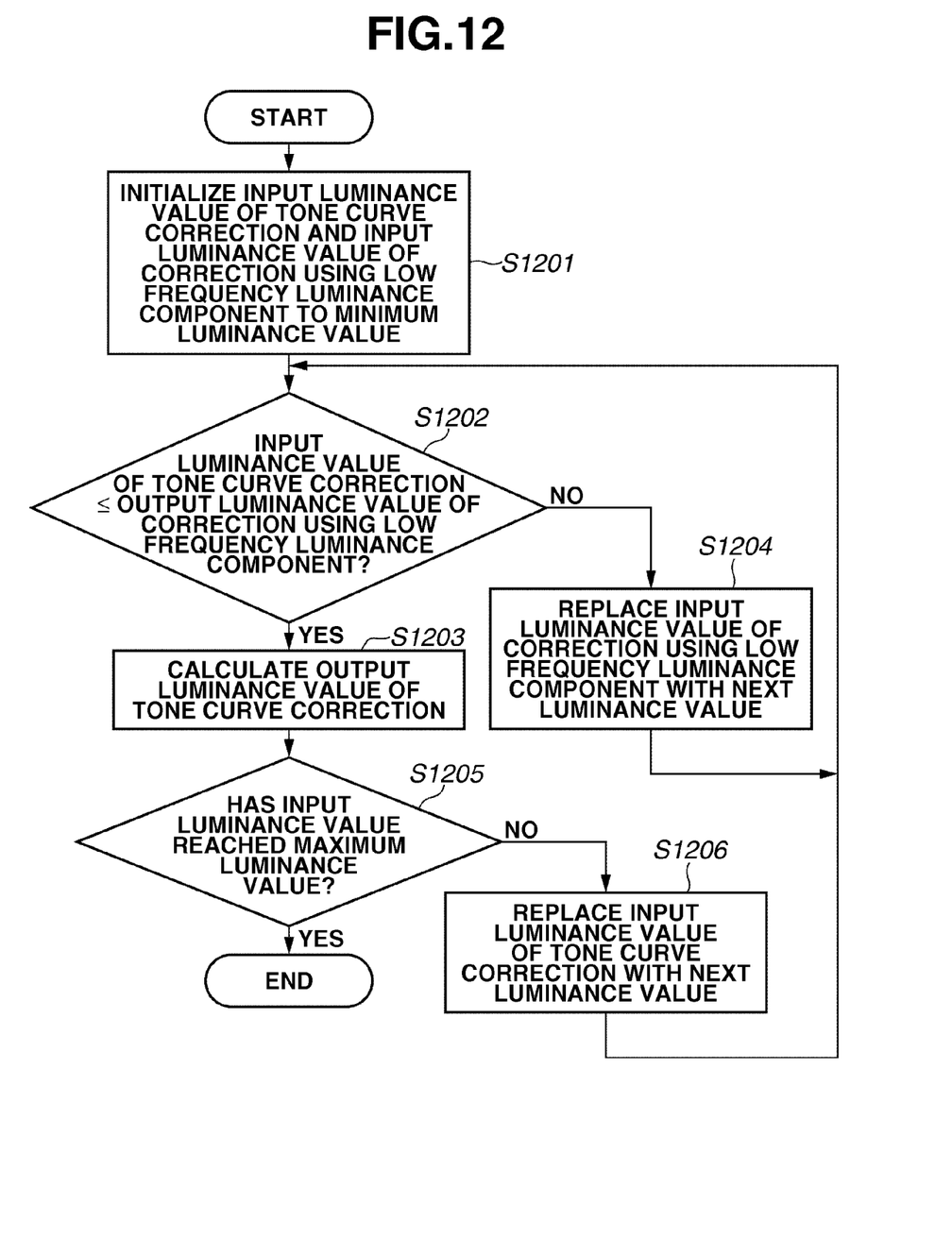
FIG. 12 is a flowchart illustrating a calculation method of a correction amount of tone curve.

A flowchart of this processing is shown in FIG. 12. In step S1201 shown in FIG. 12, the correction amount calculation unit 109 first initializes an input luminance value of tone curve and an input luminance value of a lookup table for correction using a low frequency luminance component at a minimum luminance value (for example 0) that an image can acquire.

In subsequent step S1201, the correction amount calculation unit 109 compares an input luminance value of tone curve and an output luminance value to an input luminance value of correction using a low frequency luminance component. When the former is larger (NO in step S1202), in step S1204, an input luminance value of correction using a low frequency luminance component is replaced with a next luminance value and the processing proceeds back to step S1202.

When the latter is larger, or the former is the same (YES in step S1202) as the latter, in step S1203, the correction amount calculation unit 109 determines an output luminance value Y[i] of tone curve by the following equation (4) using a linear interpolation.

$$Y[i] = \frac{Y1[j] \times (i - Y2[j-1]) + Y1[j-1] \times (Y2[j] - i)}{Y2[j] - Y2[j-1]} \quad (4)$$

where i is an input luminance value of tone curve and j is an input luminance value of correction using a low frequency luminance component. Further, Y1[i] is a target luminance value of correction relative to the input luminance value i and Y2[i] is an output luminance value of correction using a low frequency luminance component relative to the input luminance value i.

In step S1205, the correction amount calculation unit 109 determines whether an input luminance value of tone curve has reached a maximum luminance value (for example, 255) that an image can acquire. If it is not a maximum luminance value, in step S1206, the correction amount calculation unit 109 replaces an input luminance value of tone curve with a next luminance value and the processing proceeds to step S1202. If it is a maximum luminance value, the processing ends. By the processing described above, a lookup table for tone curve can be generated.

In the present exemplary embodiment, first, a correction amount using a low frequency luminance component is determined and a correction amount of tone curve is calculated to obtain a remaining correction amount as to a correction amount of a target value by tone curve. However, the present invention is not limited to this embodiment. For example, first, a correction amount of tone curve may be determined and a correction amount using a low frequency luminance component may be calculated to obtain a remaining correction amount as to a correction amount of a target value using a low frequency luminance component. Also in this case, if correction using a low frequency luminance component is approximated to correction using only a luminance value Y(x,y) of a pixel to be observed, correction using a low frequency luminance component and tone curve are regarded as the same processing. Thus, the similar processing to the present exemplary embodiment may be executed.

As described above, according to the present exemplary embodiment, when gradation correction of a captured image is executed, information about a main object from a captured image and information about a histogram of a captured image are acquired, and a target value of gradation correction of a captured image is calculated based on these information. Then, each correction amount of gradation by correction using a low frequency luminance component and tone curve is calculated, so that gradation correction of an image using a low frequency luminance component and tone curve is performed. By executing such correction, an image correction result which is excellent in brightness and contrast can be obtained.

Further, strength of correction using a low frequency luminance component can be determined by operation of a user. This allows a user to determine easily a correction amount using a low frequency luminance component and a correction amount of tone curve corresponding to favorite image quality of a user with respect to strength of contrast.

In the first exemplary embodiment, a target correction value is determined from information about a main object of a captured image or a histogram of a captured image, and an influence on image quality from the imaging condition of a camera is not considered to determine a target value of correction.

In a second exemplary embodiment, a target correction value is set corresponding to setting of ISO sensitivity as one example of an imaging condition. A determination flow of a target correction value is similar to the first exemplary embodiment. However, the present exemplary embodiment is different in that the present exemplary embodiment has a correction table shown in FIG. 7 in the first exemplary embodiment for each of ISO sensitivity.

Figure 13:
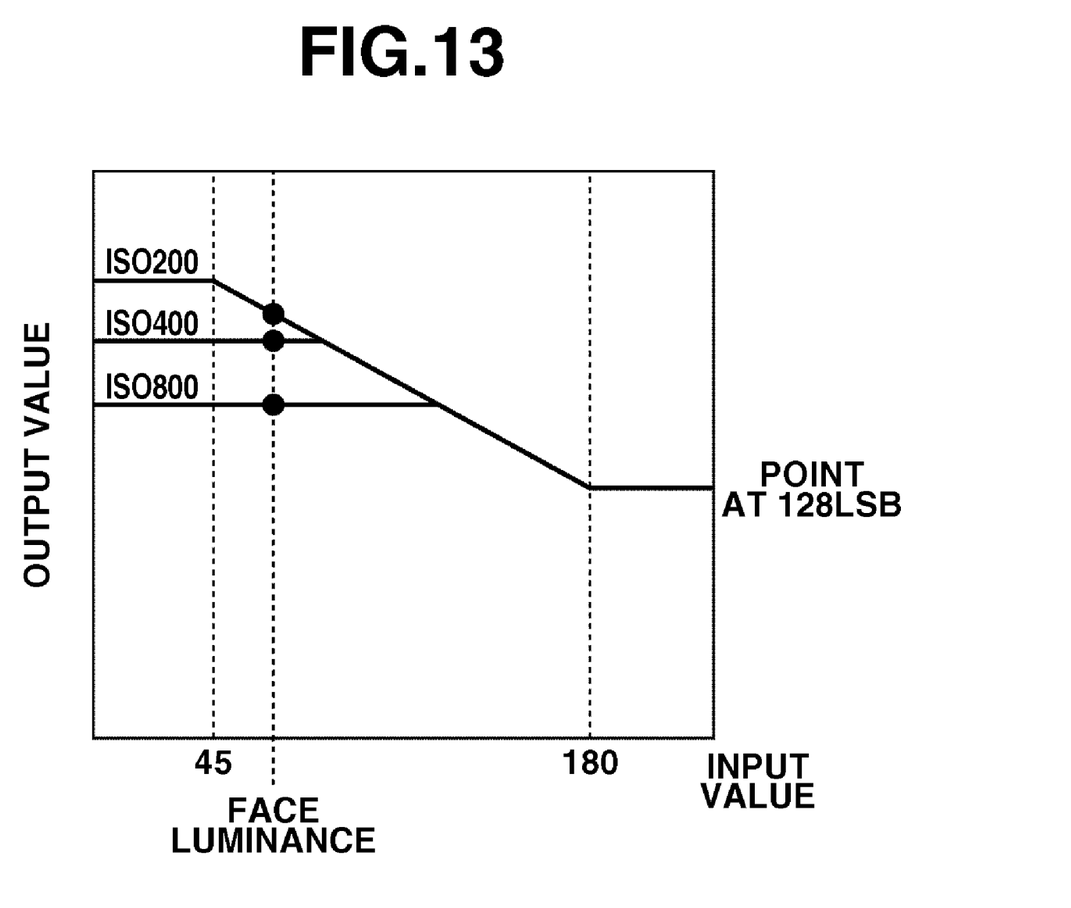
FIG. 13 is a diagram illustrating a correction table for each of ISO sensitivity.

One example is shown in FIG. 13. A correction table is different for each setting of ISO sensitivity of 200, 400 and 800. Before capturing an image, ISO sensitivity is set by a user. During photographing, a table corresponding to the set ISO sensitivity is read, interpolation processing similar to that shown in FIG. 7 is executed, and a lookup table of a target value is generated.

Thus, a plurality of correction tables corresponding to ISO sensitivity is provided, so that a more suitable target correction value which has considered an influence on image quality at each of ISO sensitivity can be determined.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2002-201967 filed Aug. 5, 2008, which is hereby incorporated by reference herein in its entirety.

What is claimed is:
1. An apparatus comprising:
a calculation unit configured to calculate a target value of gradation correction of a captured image;
an extraction unit configured to extract a luminance component image and a low frequency component image of the luminance component image from the captured image;
a first processing unit configured to execute first gradation correction processing to the captured image using the luminance component image and the low frequency component image;
a second processing unit configured to execute second gradation correction processing to the captured image by tone curve;

a setting unit configured to set a correction level of the first gradation correction processing in response to an input by a user operation; and a determination unit configured to determine a correction amount of the first gradation correction processing and a correction amount of the second gradation correction processing based on the calculated target value and the set correction level.

2. The apparatus according to claim 1, further comprising: an acquisition unit configured to acquire at least one of information about a main object of the captured image and information about a histogram of the captured image, wherein the calculation unit calculates the target value based on the acquired information.

3. The apparatus according to claim 2, wherein the determination unit increases a ratio of the correction amount of the first gradation correction processing compared with the case in which information about a face is not acquired when the acquisition unit acquires information about a face as information about the main object.

4. The apparatus according to claim 2, wherein when the acquisition unit acquires information about a plurality of faces as information about the main object, the calculation unit calculates the target value of the gradation correction based on an average and a maximum luminance values of the plurality of faces.

5. The apparatus according to claim 1, wherein the calculation unit calculates the target value of the gradation correction corresponding to ISO sensitivity in photographing the captured image.

6. The apparatus according to claim 1, wherein the determination unit determines that an amount subtracting the correction amount of the first gradation correction processing from the target value as the correction amount of the second gradation correction processing.

7. A method comprising:
calculating a target value of gradation correction of a captured image;
extracting a luminance component image and a low frequency component image of the luminance component image from the captured image;
executing first gradation correction processing to the captured image using the luminance component image and the low frequency component image;
executing second gradation correction processing to the captured image by tone curve;
setting a correction level of the first gradation correction processing in response to an input by a user operation; and
determining a correction amount of the first gradation correction processing and a correction amount of the second gradation correction processing based on the calculated target value and the set correction level.

8. The method according to claim 7, further comprising:
acquiring at least one of information about a main object of the captured image and information about a histogram of the captured image, wherein the calculating of the target value is based on the acquired information.

9. The method according to claim 8, further comprising increasing a ratio of the correction amount of the first gradation correction processing compared with the case in which information about a face is not acquired when the acquiring information about a face as information about the main object.

10. The method according to claim 8, wherein when the acquiring information about a plurality of faces as information about the main object, the calculating the target value of the gradation correction is based on an average and maximum luminance values of the plurality of faces.

11. The method according to claim 7, wherein the calculating the target value of the gradation correction corresponding to ISO sensitivity in photographing the captured image.

12. The method according to claim 7, wherein the determining that an amount subtracting the correction amount of the first gradation correction processing from the target value is the correction amount of the second gradation correction processing.

13. An apparatus comprising:
an extraction unit configured to extract a luminance component image and a low frequency component image of the luminance component image from a captured image;
a first processing unit configured to execute first gradation correction processing to the captured image using the luminance component image and the low frequency component image;
a second processing unit configured to execute second gradation correction processing to the captured image by tone curve;
a setting unit configured to set a correction level of gradation correction of the captured image in response to an input by a user operation; and
a determination unit configured to determine a correction amount of the first gradation correction processing and a correction amount of the second gradation correction processing based on the set correction level.

14. The apparatus according to claim 13, further comprising:
a calculation unit configured to calculate a target value of gradation correction of the captured image;
wherein the determination unit determines the correction amount of the first gradation correction processing and the correction amount of the second gradation correction processing based on the set correction level and the calculated target value.

15. A method comprising:
extracting a luminance component image and a low frequency component image of the luminance component image from a captured image;
executing first gradation correction processing to the captured image using the luminance component image and the low frequency component image;
executing second gradation correction processing to the captured image by tone curve;
setting a correction level of gradation correction of the captured image in response to an input by a user operation; and
determining a correction amount of the first gradation correction processing and a correction amount of the second gradation correction processing based on the set correction level.

* * * * *